Figure 1:
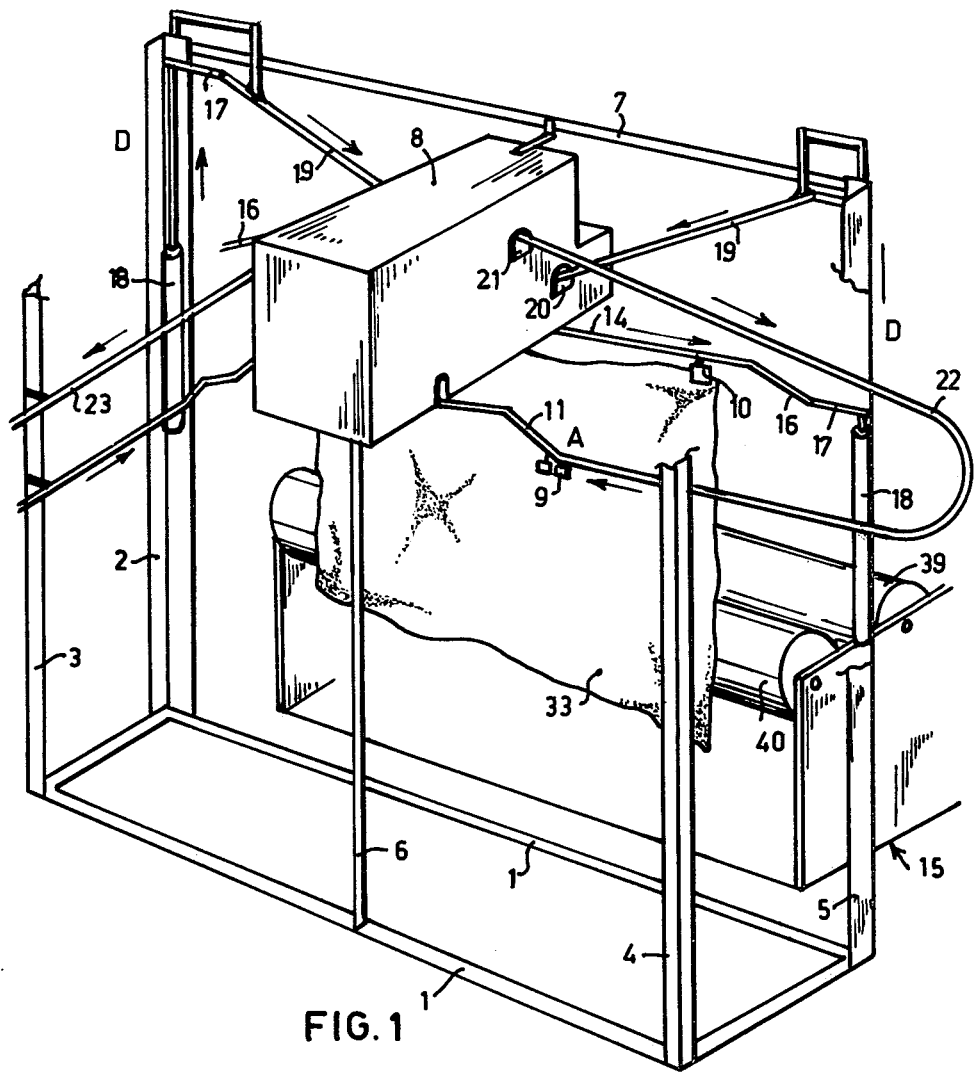

United States Patent [19]

van Rumpt et al.

[11] 4,313,269

[45] Feb. 2, 1982

[54] FEEDING MACHINE FOR SHEETS

[75] Inventors: Jacob van Rumpt, Vught; Martinus T. Vorstenbosch, Den Dungen, both of Netherlands

[73] Assignee: Amko B.V., Kerkdriel, Netherlands

[21] Appl. No.: 18,663

[22] Filed: Mar. 8, 1979

[30] Foreign Application Priority Data

Mar. 9, 1978 [NL] Netherlands ............... 7802582

[51] Int. Cl.³ .................................. D06F 67/04
[52] U.S. Cl. .......................................... 38/143
[58] Field of Search ........................ 38/7–12, 38/143; 106/144; 198/464, 486; 271/63

[56] References Cited

U.S. PATENT DOCUMENTS

| | | | |
|---|---|---|---|
| 3,604,132 | 9/1971 | Thompson et al. | 38/143 |
| 3,791,057 | 2/1974 | Hall | 38/143 |
| 4,050,173 | 9/1977 | Olsen | 38/143 |
| 4,106,227 | 8/1978 | Allen et al. | 38/143 |
| 4,143,476 | 3/1979 | Holmes | 38/7 |

*Primary Examiner*—Louis Rimrodt
*Attorney, Agent, or Firm*—Frost & Jacobs

[57] ABSTRACT

Inserting machine destined to stretch and lay down washed sheets and the like wettish articles to be loaded in a mangle. Two corners of those sheets are attached to clamps connected to carts for movement in a continuous path. Conveyor mechanisms and belonging switches are provided to minimize the number of manipulations of the washed sheets and to take full advantage of the capacity of the mangle.

19 Claims, 11 Drawing Figures

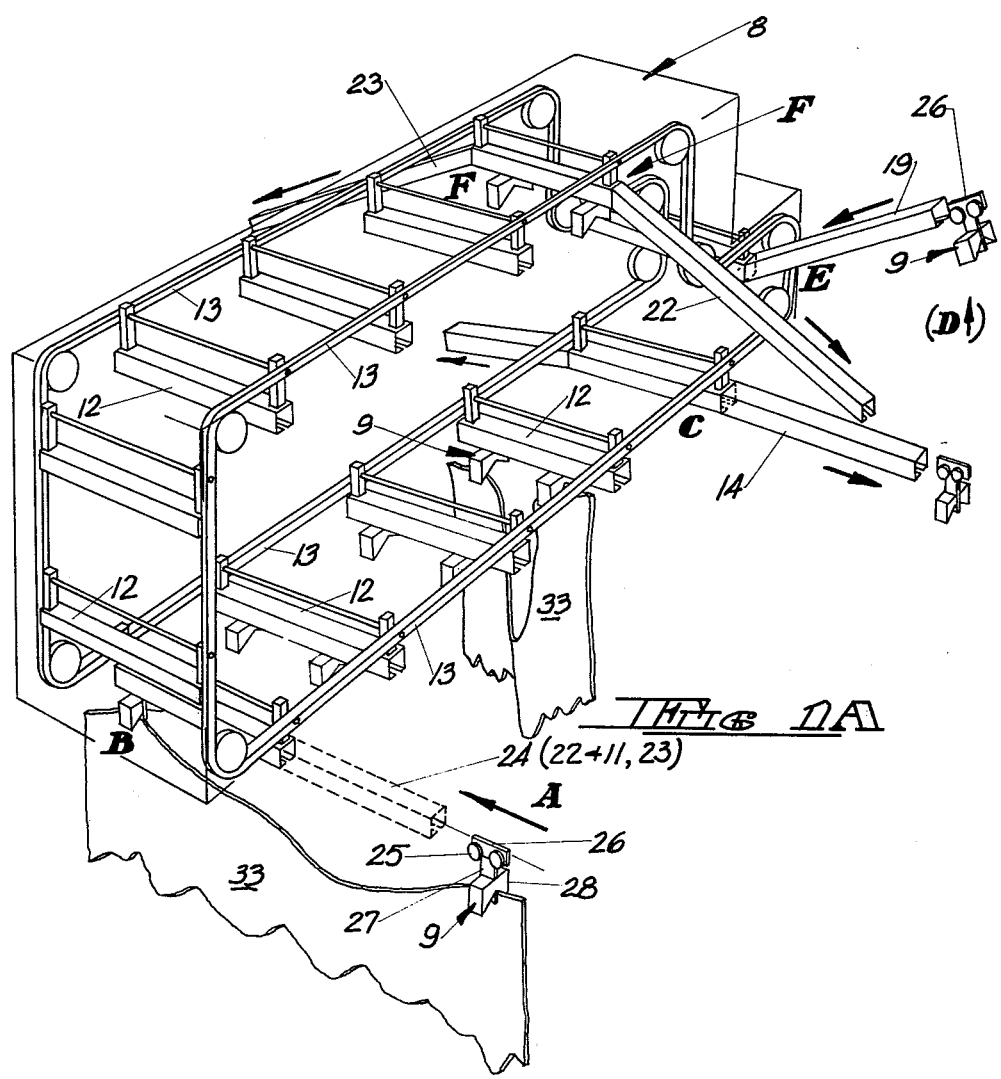

FEEDING MACHINE FOR SHEETS

The present invention relates to an inserting machine, destined to stretch and lay down washed sheets and the like articles, suspended in clamps in a hang-out station, to serve as a feed device for a mangle.

Such a machine is known from Dutch patent application 67 01490, now Dutch Pat. No. 159,738. These and similar machines dispose of one hang-out station, but embodiments are known with maximally four hang-out stations. A pair of clamps is provided per hang-out station, in which clamps an assistant hangs out a sheet. The disadvantages of such machines are:

the assistant who hangs out the sheets in a control station, must wait before hanging out a next sheet until the clamps have returned empty, the next sheet can only be introduced in the machine when the empty clamps return after spreading to the center or the side of the machine, so that the capacity is restricted, in the known machines the sheet has to be hung out near the mangle, whereas mostly the sheets have been taken in the hand in an earlier stage, for instance when sorting them out, after which they are put in a tray and in the conventional machines they have to be taken out of the tray again at the mangle, laying down a sheet which is suspended at two points mostly has as a consequence that the front side is not laid down straight and right.

The invention solves the above problems and disadvantages.

According to the invention this is achieved by having the clamps secured to carts which are guided by means of guide members along a plurality of successive stations to a central store whereby the sheet, after being stretched, is taken over by a loading system which feeds the sheet to a mangle. Said carts return after stretching, each time, to the central store. The central store communicates with at least one hang-out station via guide means which are suitable for the carts, and the central store is comprised preferably of two parallelly extending step-wise rotating chains from which freely rotating pieces of rail are suspended with a length which is quite sufficient to be adapted to contain two carts which are driven away from each other by a spread unit, while at both sides of the machine lift members are arranged which, after releasing the sheet, take the carts to highly located guide means from where they return into the central store under the influence of gravity.

The guide members and the pieces of rail consist preferably of tubular profiles and the clamps consist preferably of a clamping plate, connected to the cart, to which plate at least one clamp housing is secured which provides pivots for a clamping clip cooperating with the clamping plate. The pivots are preferably embodied as so-called wobble holes with a longitudinal center-line which is substantially perpendicular to the clamping plate.

The loading system consists preferably of two stop bars which are spaced such that their mutual distance is sufficiently small so that after the sheet has passed it can clamp the sheet together with the horizontal tube placed at the leading side of a slide, such that the sheet is released from the clamps of the cart. On the slide a wiper is placed, which is reciprocable by means of a driving member and has the same length as the tube and which, together with the tube, takes the smoothened edge of the sheet to the feed conveyor belt of the mangle.

The invention will be further elucidated hereinafter on the basis of the drawing, in which by way of example two embodiments of an inserting machine according to the invention are shown.

Figure 2:
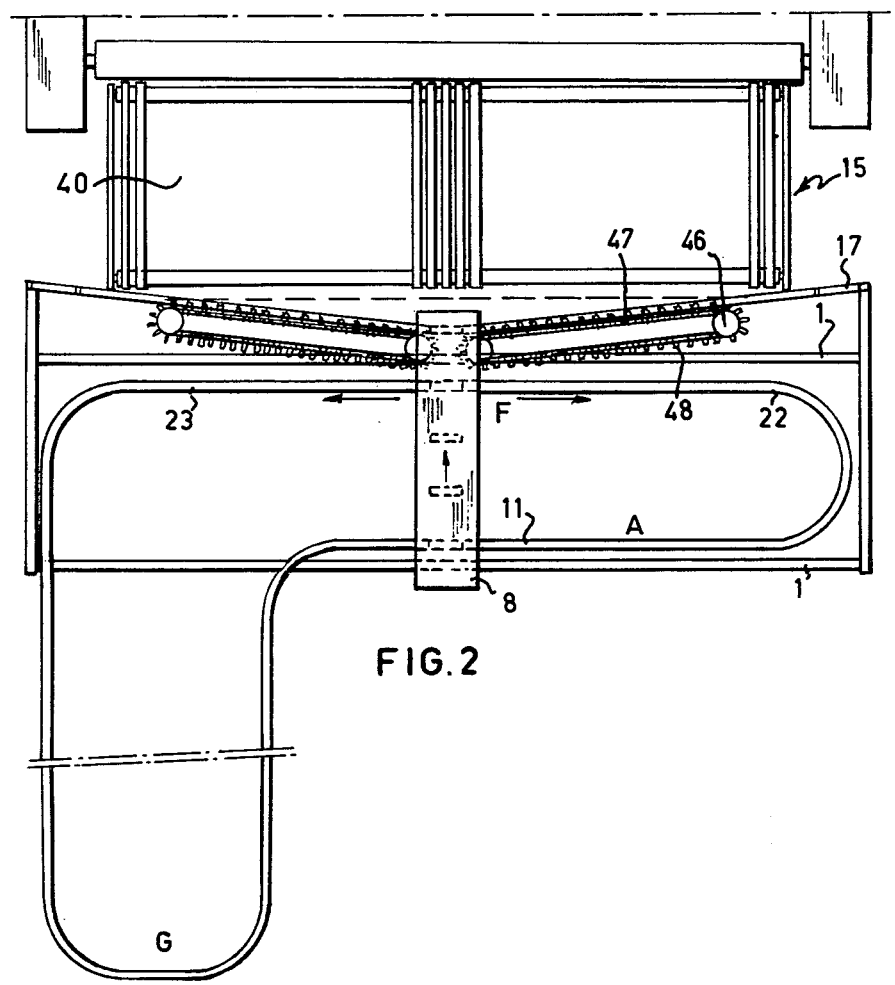
Figure 3:
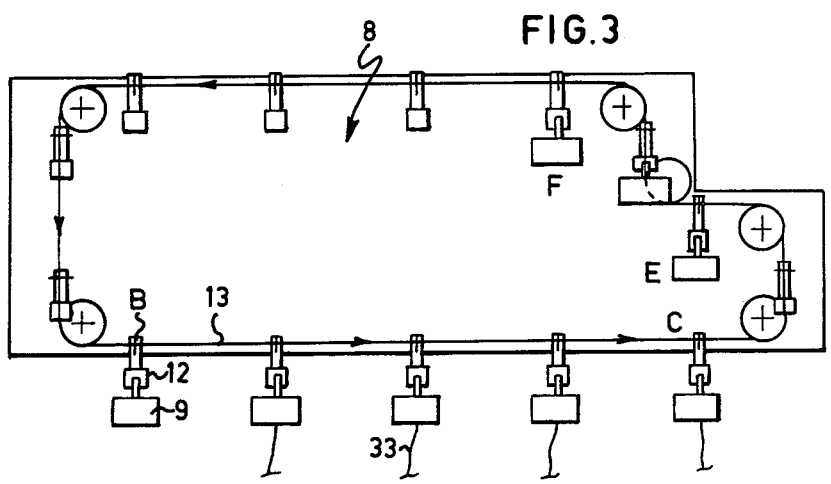
Figure 4:
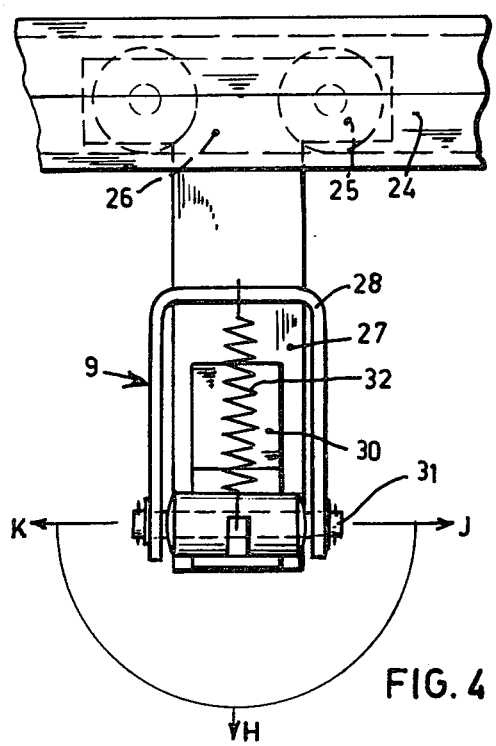
Figure 5:
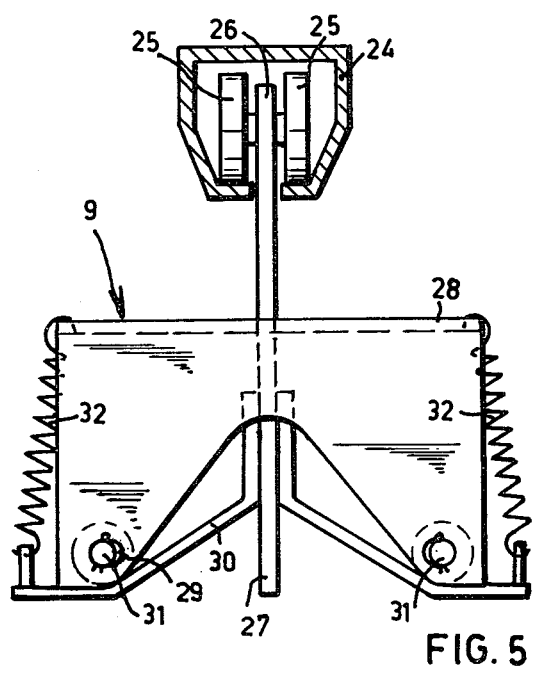
Figure 6A:
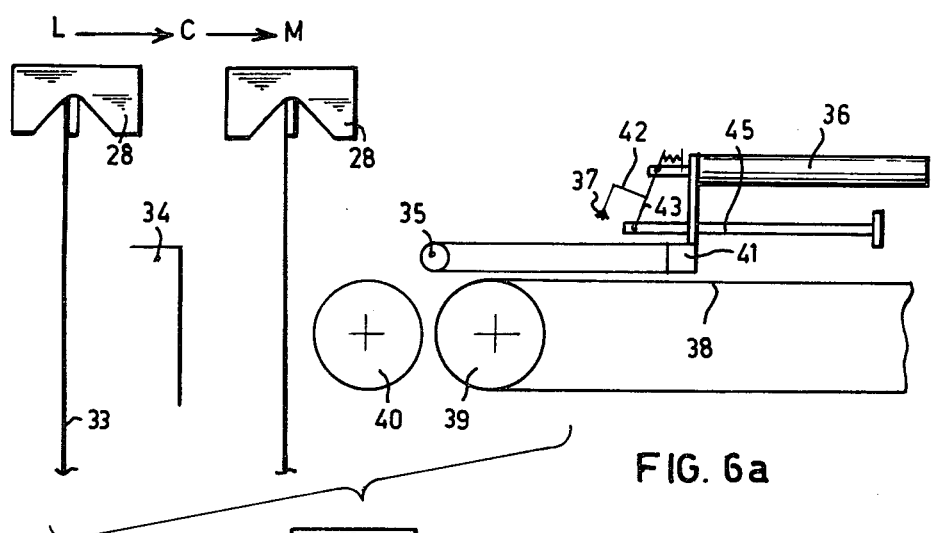
Figure 6B:
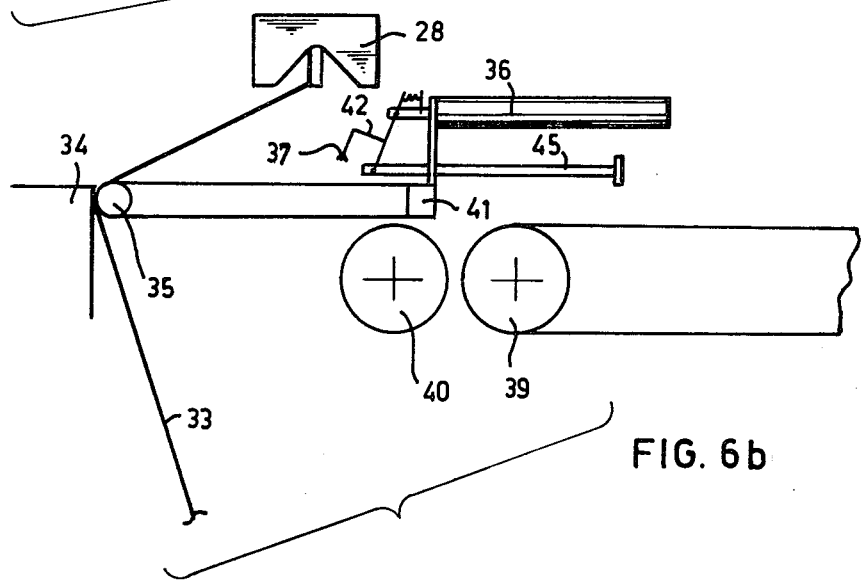
Figure 6C:
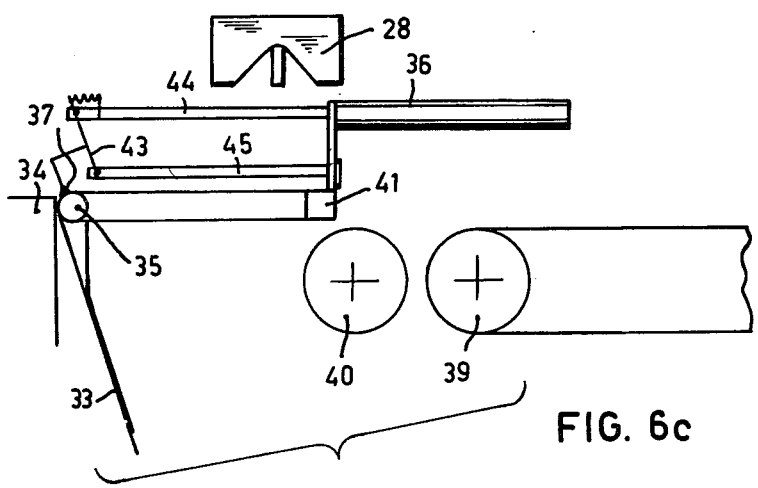
Figure 6D:
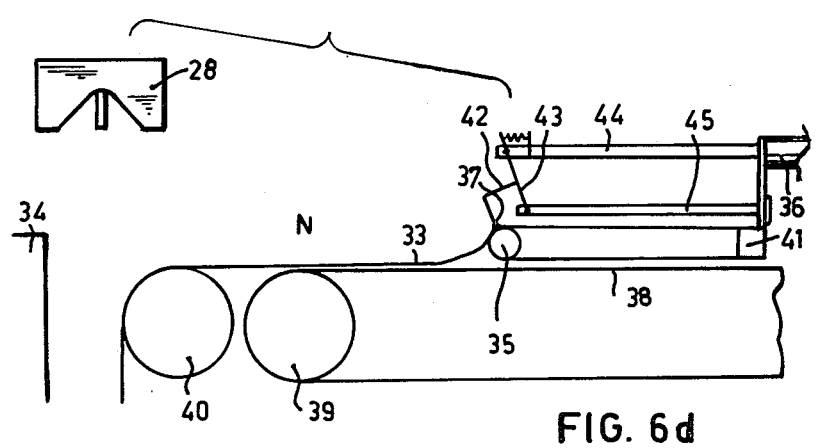
Figure 7:
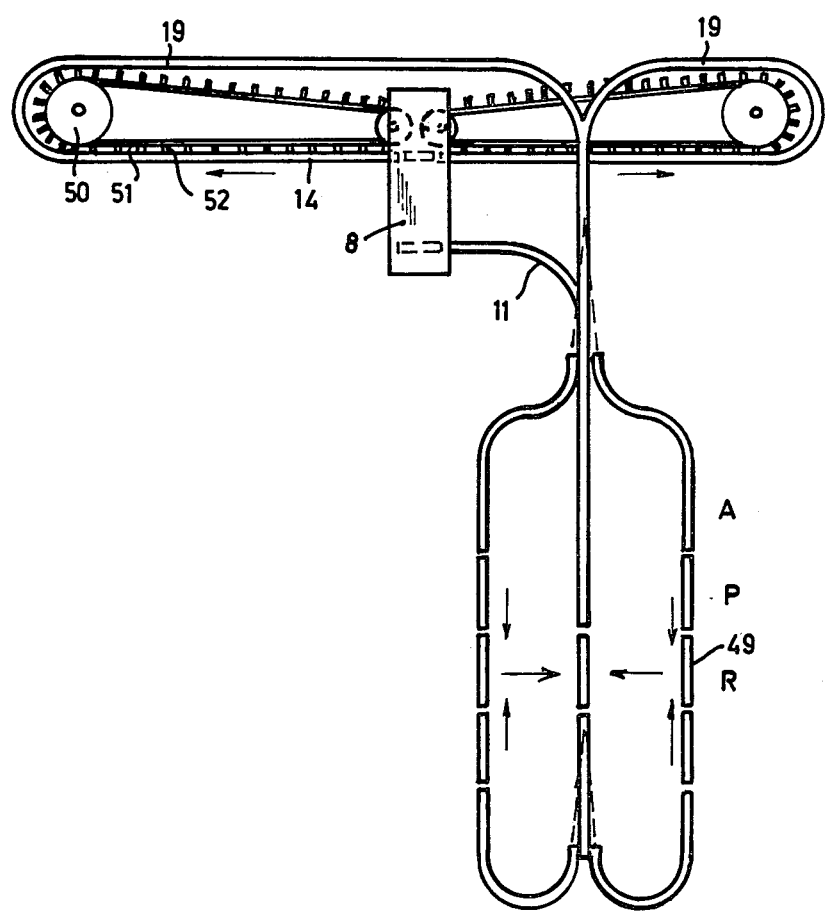

FIG. 1 shows in perspective view an outline of the hang-out and spreading portion of an inserting machine according to the invention, FIG. 1A is a top perspective view, with parts broken away, of the hang-out and spreading portion of the machine depicted in FIG. 1, FIG. 2 is a schematic top view of FIG. 1, FIG. 3 is a schematic longitudinal view of the central store of the inserting machine, FIG. 4 shows in a larger scale a front view of a clamp, FIG. 5 shows a side view of the clamp of FIG. 5, FIGS. 6a–d outline the loading system for elucidation purpose, and FIG. 7 shows a top view of another embodiment of the hang-out and spreading portion of an inserting machine according to the invention.

The hang-out and spreading portion of the inserting machine according to the invention, shown in FIG. 1, is arranged on a foundation 1 onto which in the corner points four corner posts 2–5 are placed, as well as a post 6 which supports a central store 8 together with a girder 7 interconnecting the corner posts 2 and 5, the central store 8 being at such a height above the foundation that the assistants can easily reach the clamps 9 projecting from the guide members in the hang-out stations A to clamp the sheets therein with two corners thereof each in a clamp which are still close to each other then. In FIG. 1 only two clamps 9 in one of the hang-out stations are shown and further a clamp 10 is visable of another pair which keeps a sheet 33 in the spread condition. Furthermore in FIG. 1 a number of arrows is drawn indicating the direction of movement of the clamps placed on carts, which carts are not visible in FIG. 1.

For a good understanding of the sequence of movement reference is also made to FIGS. 2 and 3. Starting in the hang-out station A the guide member, suitable for the carts 26, contains an upwardly and a downwardly extending piece 11 (vide especially FIG. 1), via which piece the two carts arrive at a stationary rail piece 12 which is rotatably suspended from a shaft placed between two chains 13 of the central store, particularly at the location of the points B of FIG. 3. The chains 13 are driven step-wise until the respective piece of rail arrive at point C of the central store where the carts are each moved to a side along a piece 14 of the guide member, thereby spreading the sheet 33. As appears from the top view of FIG. 2, the carts move along tracks which form an angle together. The driving operation takes place here by chains 47, moving around chain wheels 46 (FIG. 2), which chains have transversely projecting pins 48 which are adapted to force the carts forwardly.

At a certain moment, as will be elucidated hereinafter, the sheet is taken over by a loading system 15, so that the clamps 10 are empty again and arrive, via a declining piece 16 of the guide member (vide especially FIG. 1), in lift stations D with lifts 17 which are movable up and down for instance by cylinders 18. In FIG. 1 the left lift is drawn in its highest position, and the right lift in the low position, a portion of the corner post 5 having been broken away to make the lift visible. Generally one might think, that it would be illogical to draw the lifts in different positions, but this is not true, because they can also be embodied such that they only move upwardly when two carts with empty clamps have arrive. The available cycle time of the lifts is twice as high then, so that they can move more smoothly.

Then the carts move under the influence of gravity via a piece 19 of the guide member (not shown in FIG. 2) back to the central store where they are received again via the hole 20 (FIG. 1) at the location E (FIG. 3) by a piece of rail 12, which is stationary at that moment. At the intermitting movement of the chains 13 the carts are taken to a higher level again, so that via the holes 21 (FIG. 1) at the location F (FIG. 3) they can be discharged from the central store again to an inclined piece 22 of the guide member and thus return into the hang-out station A. The carts can, however, also be taken to a piece 23, opposite to the piece 22, and be handled in another, possibly spaced therefrom hang-out station G. It will be clear that the longer the central store 8 is embodied, the more possibilities there are to ensure that a high number and constant succession of sheets to be mangled can be fed to the loading system. But it is also possible to embody the store 8 even shorter and to include therein only for instance four pieces of rail 12 moving along a circular path. In that case elsewhere within the assembly possibilities for stock have to be developed and an example thereof will be elucidated on the basis of FIG. 7.

In FIGS. 4 and 5 some details of the carts, clamps and pertaining guide members are shown, from which appears that the guide members may consist of split tubular profiles 24 of for instance aluminium or an aluminium alloy, so that they can be bent nearly regularly, possibly while making indentations in the material of the inner corners. The gap provides a passage for a cart 26, provided with wheels 25, which cart carries a clamping plate 27 to which clamping tubes 28 are welded, and in which holes 29 are made to have shafts 31, secured to clamping clips 30, rotate. The clamping clips are folded such that a wedge-operation is achieved, and in order to stimulate this operation a draw-spring 32 is provided and the contacting surfaces can furthermore be coated with a friction material.

It is known to excert a force on the sheet in the direction of the arrow H of FIG. 4 by the wedge-operation, the essential characteristic of the respective clamp is, however, that forces can also be exerted in the direction of the arrows J and K, which is important as when spreading the sheet forces are also excerted in those directions. This is achieved by that the holes 29 are embodied as so-called wobble holes with a center line which is substantially perpendicular to the clamping plate 27, so that the pivot of the clamping clip 30 may tilt. As the carts have a clamping clip both at the left and the right side of FIG. 4, it is not important whether they pass through the central store either to the guide member 22 or a next time to the guide member 23 of FIGS. 1 and 2.

It is remarked that the pieces of rail 12 of the central store 8 (FIG. 3) will substantially show the same cross-sectional shape as is indicated for the split tubular profiles 24 of FIG. 5.

The loading system will be further elucidated hereinafter on the basis of FIG. 6a–d.

In the central store the clamping housings 28 having the sheet 33 hang-out therein are brought from the position L to the position C (FIG. 3). When moving from L to C the sheet passes two stop bars 34 which are aligned, with an opening between the two bar heads. After the spreading action the clamping housings 28 are in the position M, after which a tube 35, placed on a slide of the loading system, moves such that the sheet is forced against the stop bars 34 (FIG. 6b). After this the clamps will release the sheet, which then falls over the tube 35 (FIG. 6c). A cylinder 36, placed on a reciprocable slide 41, forces a wiper 37 over the sheet on the cloth, so that the sheet is clamped between the tube 35 and the wiper 37 (FIG. 6c), which both extend along the full width of the loading system. After that the tube and the wiper are jointly drawn along a feed belt 38 of the mangle, and a brake drum 40, placed in front of the drum 39 along which the feed belt extends, stops at the moment that the tube 35 passes the position M (FIG. 6d). Hereby the wettish sheet is stopped and slides between the tube 35 and the wiper 37, during which the leading edge is wiped off well. When the sheet is completely wound-off the tube 35, which can be detected by a photocell (not shown), the brake drum 40 will start to rotate again and the sheet is discharged to the mangle.

It is furthermore important to remark while referring to FIG. 6d, that the wiper is arranged on a link 43 which is at right angles to a jib 42, said link being on the one hand connected rotatable to a piston rod 44 of the cylinder 36 and on the other hand connected to a freely reciprocable bar 45 which extends parallelly in the vertical surface thereof, which will cause the wiper 37 to be always in the most favourable position, i.e. "up" if it needs not operate and "down" if it has to do its useful work.

Hereinafter will be given a description of the way in which one should work with the machine.

In the hang-out station A an assistant takes a sheet with his two hands at one point. The piece of sheet between the hands is stretched and placed between the clamping clip 30 and the clamping plate 27. The spring 32 ensures the clamping plate and the clamping clip to be tightly pressed against each other. The location of the hang out stations can be different for any machine. The number of hang-out stations may also vary. In practice mostly minimally two, three or four stations will be provided. After the assistant treats a second point of the sheet in the same way, the two clamps are pushed over the bump 11 and under the influence of gravity or because they are driven they go to position B of FIG. 3. If a large number of hang-out stations is present, there are various insertion positions B at both sides of the central store 8, a control member determining individually from what tubular profile a (not shown) pneumatic cylinder will slide two carts onto the rail piece 12. Owing to the central store changes in the supply of hang-out sheets will not adversely affect the use of the drying capacity of the mangle. So now the sheets are underneath the central store from where the pieces of rail 12 are moved step-wise to the spreading portion, where the one cart is pushed to the left and the other cart pushed to the right out of the piece of rail by the chain systems 46,47 with entraining member 48. When the sheet is almost sufficiently spread, which is signalled by a (not shown) photocell which sees that the sheet's center reached a certain height, the driving will pass over to a lower speed and finally it stops after which the sheet can be released and taken over by the loading system, which is already amply elucidated, while in the meantime the next sheet is spread again.

The top view of FIG. 7 showing another embodiment of the hang-out and spreading portion of an inserting machine, is comparable in many aspects to the top view of FIG. 2 and the same reference numerals and letters will be used to indicate parts which are substantially the same in both embodiments. In the hang-out station A a sheet is clamped with two corners each in a clamp of a cart, then both carts are pushed to a waiting station P. In FIG. 7 four hang-out and waiting stations are shown which are all connected to a common lift station R having rail pieces 49 which are moved to the level of a downwardly extending rail piece 11, via which piece the two carts arrive at a rail piece 12 which is rotatably suspended from a shaft placed between two chains 13 of a central store which has resemblances with the store shown in FIG. 3 but can be embodied more compactly, for example with only four pieces of rail moving along a circular path, because there are four waiting stations P now. The carts further each move to a side along a rail piece 14 thereby spreading the sheet. The driving operation takes place here by belts 51 moving around pulleys 50, which belts have transversely projecting pins 52 which are adapted to force the carts forwardly. Providing belts instead of the chains of the embodiment of FIG. 2 has the advantages that by using additional (not shown) pulleys the carts can be driven in planes having a mutual angle, so that the guide members can again have declining pieces 19 to permit the carts to return to the various feeding stations A.

Within the scope of the claims other embodiments are covered than indicated in the drawing.

What is claimed is:

1. Inserting machine, destined to stretch and lay down washed sheets and the like articles, suspended in clamps in a hang-out station, on a feed device of a mangle, characterized in that the clamps (9) are secured to carts (26) which are guided by means of driving members (11,13) along a continuous path having successive stations (A or G, 8, and B through F), said carts moving to a cart spread station (C) and then returning after stretching each time to a central store (8), the sheet, after being stretched (C), being taken over by a loading system (15) which feeds the sheet to a mangle.

2. Inserting machine according to claim 1, characterized in that via guide means (11) suitable for the carts, the central store communicates with at least one hang-out station (A or G).

3. An inserting machine according to claim 2, characterized in that the central store consists of two parallelly extending step-wise rotating chains (13) from which freely rotating pieces of rail (12) are suspended with a length which is quite sufficiently to be adapted to contain two carts which are driven away from each other by a spread unit, while at both sides of the machine lift members (18) are arranged which, after releasing the sheet, take the carts to highly located quide means (19) from where they return into the central store (8) under the influence of gravity.

4. An inserting machine according to claim 3 characterized in that the guide members and the pieces of rail consist of split tubular profiles (24).

5. An inserting machine according to claim 1 characterized in that the central store consists of two parallelly extending step-wise rotating chains (13) from which freely rotating pieces of rail (12) are suspended with a length which is quite sufficiently to be adapted to contain two carts which are driven away from each other by a spread unit, while at both sides of the machine lift members (18) are arranged which, after releasing the sheet, take the carts to highly located guide means (19) from where they return into the central store (8) under the influence of gravity.

6. Inserting machine according to claim 5, characterized in that the lift member can receive more than one cart at the same time.

7. An inserting machine according to claim 5, characterized in that the freely rotatable pieces of rail in the store are brought at a higher level between the point where the carts return into the store and the point where the carts are sent to the hang-out stations.

8. Inserting machine according to claim 1, characterized in that the clamps consist of a clamping plate (27), connected to the cart, to which plate at least one clamp housing (28) is secured which provides pivots for a clamping clip (30) cooperating with the clamping plate.

9. An inserting machine according to claim 8, characterized in that the clamping clip is forced against the clamping plate by means of a spring (32).

10. An inserting machine according to claim 8 or 9, characterized in that the pivots are embodied as so-called wobble holes (29) with a longitudinal centerline which is substantially perpendicular to the clamping plate (27).

11. An inserting machine according to claim 8, characterized in that the clamping plate and the clamping clips are coated with friction material.

12. An inserting machine according to claim 1, characterized in that the loading system (15) consists of two stop bars (34) which are spaced such that their mutual distance is sufficiently small so that after the sheet has passed, it can clamp the sheet together with the horizontal tube (35) placed at the leading side of a slide (41), such that the sheet is released from the clamps of the cart.

13. An inserting machine according to claim 12, characterized in that a wiper (37) is placed on the slide (41), said wiper being reciprocable by means of a driving member and having the same length as the tube and which, together with the tube, takes the smoothened edge of the sheet to the feed conveyor belt (38) of the mangle.

14. An apparatus according to claim 12 or 13, characterized in that a brake drum (40) preceeds the drum (39) of the conveyor belt (38), which brake drum stops when the edge of the sheet reaches the feed conveyor belt, after which the slide (41) moves back over some distance so that the sheet passes between the tube and the wiper.

15. An inserting machine according to claim 13, characterized in that the wiper (37) is located on a link (43) placed at right angles to a jib (42) which is rotatably connected on the one hand to the drive rod (44) of the drive member and on the other hand to a freely reciprocable rod (45) arranged in the vertical plane parallelly thereto.

16. An inserting machine according to claim 1, characterized in that the movements of the carts and the support system are controlled automatically.

17. An apparatus according to claim 16, characterized in that photocells are used for the automatic control.

18. An inserting machine for feeding stretched wet sheets to a mangle or the like, said machine comprising: a guide track system arranged in a continuous path; a plurality of carts individually movable on said track system, each said cart having a sheet receiving clamp thereon; a hang-out station in said track system and at which two corners of a sheet may be secured to a pair of carts, each corner in a separate clamp on an individual cart; a central store having a cart receiving rail piece therein, said rail piece being disposed so as to receive carts from said track system and to discharge carts back onto said track system; conveyor means in said central store for moving said rail piece intermittently from a cart receiving position to a cart discharge position, spreading means at said discharge position to engage a pair of said carts, each having a corner of a sheet clamped thereto, and move same in opposite directions to stretch the sheet; and a loading system to receive a stretched sheet from a pair of said carts and to feed said sheet to a mangle or the like, whereafter the said carts from which the stretched sheet was taken by the said loading system returned to the said track system for continuous movement back to a hang-out station for eventual return to the said central store and to a said rail piece therein with another sheet clamped thereto.

19. The inserting machine of claim 18 including a plurality of said rail pieces in said central store, and a plurality of hang-out stations in said track system.

* * * * *